United States Patent
Johansson

(10) Patent No.: US 10,063,791 B2
(45) Date of Patent: Aug. 28, 2018

(54) METHOD FOR PRESENTATION OF IMAGES

(71) Applicant: Sony Corporation, Tokyo (JP)

(72) Inventor: Fredrik Johansson, Malmo (SE)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 58 days.

(21) Appl. No.: 14/385,767

(22) PCT Filed: Feb. 12, 2014

(86) PCT No.: PCT/IB2014/000141
§ 371 (c)(1),
(2) Date: Sep. 16, 2014

(87) PCT Pub. No.: WO2015/121699
PCT Pub. Date: Aug. 20, 2015

(65) Prior Publication Data
US 2016/0248992 A1      Aug. 25, 2016

(51) Int. Cl.
H04N 5/222      (2006.01)
H04N 5/262      (2006.01)
H04N 1/21       (2006.01)
H04N 5/232      (2006.01)

(52) U.S. Cl.
CPC ........... *H04N 5/2621* (2013.01); *H04N 1/215* (2013.01); *H04N 5/23235* (2013.01); *H04N 5/23293* (2013.01)

(58) Field of Classification Search
CPC .. H04N 5/2621; H04N 5/23293; H04N 1/215; H04N 5/23235

USPC ............... 348/333.01–333.05, 333.1, 239
See application file for complete search history.

(56) References Cited

U.S. PATENT DOCUMENTS

| | | | |
|---|---|---|---|
| 2002/0003943 A1 | 1/2002 | Shimizu | |
| 2005/0190280 A1 | 9/2005 | Haas et al. | |
| 2008/0284866 A1 | 11/2008 | Mizutani | |
| 2009/0207279 A1* | 8/2009 | Ochi | H04N 5/23219 348/231.99 |

(Continued)

FOREIGN PATENT DOCUMENTS

| | | |
|---|---|---|
| CN | 101584205 | 11/2009 |
| EP | 2129111 | 12/2009 |

(Continued)

OTHER PUBLICATIONS

International Search Report from corresponding International Application No. PCT/IB2014/000141, dated Aug. 12, 2014.

(Continued)

*Primary Examiner* — Yogesh Aggarwal
(74) *Attorney, Agent, or Firm* — Renner Otto Boisselle and Sklar

(57) ABSTRACT

The invention concerns a method for displaying an image on a display of an electronic device, wherein the image is one selected image of a burst of images. The method comprises the steps of capturing a burst of images, comprising at least three images, defining a main image by selecting one image of the captured burst of images, defining the at least one images obtained before the selected main image as pre-images, displaying the defined pre-images and the selected main image in sequence on the display.

12 Claims, 4 Drawing Sheets

(56) References Cited

U.S. PATENT DOCUMENTS

| | | |
|---|---|---|
| 2010/0134644 A1 | 6/2010 | Kita |
| 2010/0194963 A1 | 8/2010 | Terashima |
| 2010/0208119 A1* | 8/2010 | Yoshimi .............. G06F 3/03547 348/333.01 |
| 2011/0221927 A1* | 9/2011 | Takagi ................... G11B 27/28 348/222.1 |
| 2012/0081404 A1 | 4/2012 | Maclellan et al. |
| 2012/0095817 A1* | 4/2012 | Kamil ................ G06Q 30/0241 705/14.4 |
| 2012/0249853 A1* | 10/2012 | Krolczyk ........... H04N 1/00448 348/333.01 |
| 2013/0222671 A1 | 8/2013 | Tseng et al. |
| 2015/0106722 A1* | 4/2015 | Ubillos ................ G06F 3/0488 715/731 |

FOREIGN PATENT DOCUMENTS

| | | |
|---|---|---|
| JP | 2001257926 | 9/2001 |
| JP | 2008283629 | 11/2008 |
| JP | 2009213022 | 9/2009 |
| JP | 2011099992 | 5/2011 |

OTHER PUBLICATIONS

Office Action issued from the Japanese Intellectual Property Office for corresponding Japanese Application 2016-551846 dated Nov. 7, 2017 including English translation.
Office Action dated June 19, 2018, issued in corresponding Chinese Application No. CN2014800753606.

\* cited by examiner

METHOD FOR PRESENTATION OF IMAGES

TECHNICAL FIELD

The present invention relates to a method for image presentation on a display of an electronic device. In particular the disclosure provides a method to present a selected image with a visual effect on the display, wherein the selected image is one image of a burst of images.

BACKGROUND ART

Today, images captured in a burst sequence may be processed in various ways. For example, the images may be presented to a user for selection of images to keep. In another example, the images may be combined or composited to form a single image. In another example, a burst sequence may be taken of a scene including moving objects, such as blinking eyes, moving arms. The moving object may be identified and the user can then adjust the image easily, such as removing the moving object through comparison between the images in the burst of image.

A burst sequence of images is several images or frames captured in a quick session. This is done by choosing Burst mode or Time shift mode on the image capturing device and either pressing a hard ware button, i.e. the shutter button, holding it down or pressing a screen capturing button.

Hence, Burst mode or time shift mode generates a sequence of photos that are not utilized except for very specific occasions.

SUMMARY OF THE INVENTION

The disclosure overcomes at least some of the above mentioned problems and makes it possible to utilize otherwise unused data in burst shot images and to "hide" loading time of a full resolution of the main image, e.g. the frames before and after the main image could be stored with low resolution and be utilized during the transition duration and only the main image would be displayed with full resolution.

According to one aspect of the disclosure, it provides a method for displaying an image on a display, wherein the image is one selected image of a burst of images. The method comprises the steps of capturing a burst of images comprising at least two images, selecting a main image of the burst of images, defining the at least one image obtained before said main image as pre-image, displaying the defined pre-image and the selected main image in sequence on the display. In one example, wherein the defined pre-images comprises more than one image, the method further comprises the steps of generating a visual effect of the more than one pre-images and displaying the at least more than one pre-images with said generated visual effect before displaying the defined main image. In one example, the visual effect comprises the steps of creating a zoom in effect by displaying the at least more than one pre-image directly after each other's, image by image, until stopping at the main image 1.

In one example, the method further comprises the steps of adding a light effect or a sound effect when displaying the main image.

According to one aspect of the invention, the method further comprising the step of defining the images obtained after the main images as pro-images and displaying the pro-images after displaying the pre-images and the main image in sequence on the display. In one example, wherein the defined pro-images comprises more than one image, the method further comprises the steps of generating a visual effect of the more than one pro-images and displaying the at least more than one pro-images with said generated visual effect after displaying the defined main image. In one example, the visual effect comprises the steps of displaying the at least more than one pro-images directly after each other's, starting with the first of the at least one pro-images.

In aspect of the invention, the burst of images is captured by using burst shot mode.

In aspect of the invention, the burst of images is captured by using time shift mode.

In one aspect of the invention, the method further comprises the steps of storing the pro-images obtained before the main image and the pre-images obtained after the main image with low resolution and storing the main image with high resolution. Such a solution could potentially be used to "hide" loading time of the full resolution of the main image, e.g. lower resolutions could be utilized during the transition duration and only the final frame would be displayed with full resolution.

The features of the above-mentioned embodiments can be combined in any combinations.

Some embodiments of the invention provide how to utilize otherwise unused data when capturing a burst shot of images. This innovation utilizes these burst shot images to enrich and differentiate the navigation between images in an album or photo viewer application. It is an advantage with some embodiments of the invention that they may allow for creating "movement" before the specific image is displayed to make navigation more interesting and "rich" when swiping between images. When swiping between images, a few frames before and after the photo (in the sequence) is used to create this "movement" before the specific image is displayed.

BRIEF DESCRIPTION OF THE DRAWINGS

Further objects, features and advantages of the present invention will appear from the following detailed description of the invention, wherein embodiments of the invention will be described in more detail with reference to the accompanying drawings, in which.

DETAILED DESCRIPTION

The invention makes it possible for utilizing all the images or frames of a burst of images, obtained by the use of burst shot or time shift mode, to enrich and differentiate navigation between photos in an album or photo viewer application.

A burst of images is images or frames captured in a quick session. This is done by choosing a burst or continuous high speed mode, i.e. Burst mode or Time shift mode, on the image capturing device and either pressing a hard ware button, HW button, i.e. the shutter button, holding it down or pressing a screen capturing button. A burst or continuous high speed mode is a shooting mode when capturing still images. It allows several images or frames to be captured in quick succession, a burst of images. Burst mode enables the user to select the best photo from a range of photos taken before and after the actual HW or on screen capture button is pressed. Time shift mode operates in a similar manner by taking a sequence of pictures when the capture button is pressed. These are examples; there may be other modes that currently exist or may exist in the future.

Embodiments of the present invention relate, in general, to the field of electronic devices. The present invention is for example applicable in electronic devices such as mobile telephones, pagers, communicators, wearable devices such as wristlets, watches or the like, smart phones, laptops, computers, or electronic organizers. The present invention is applicable and suitable for all electronic devices with visual interface and wireless capability, connectable to a server or any type of external memory/processor source. The description is focused on components relevant to the specific objects and functions of the invention while other components may be conventional. However, for the sake of clarity and simplicity, most embodiments outlined in this specification are related to mobile phones.

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference signs refer to like elements throughout.

Figure 1:
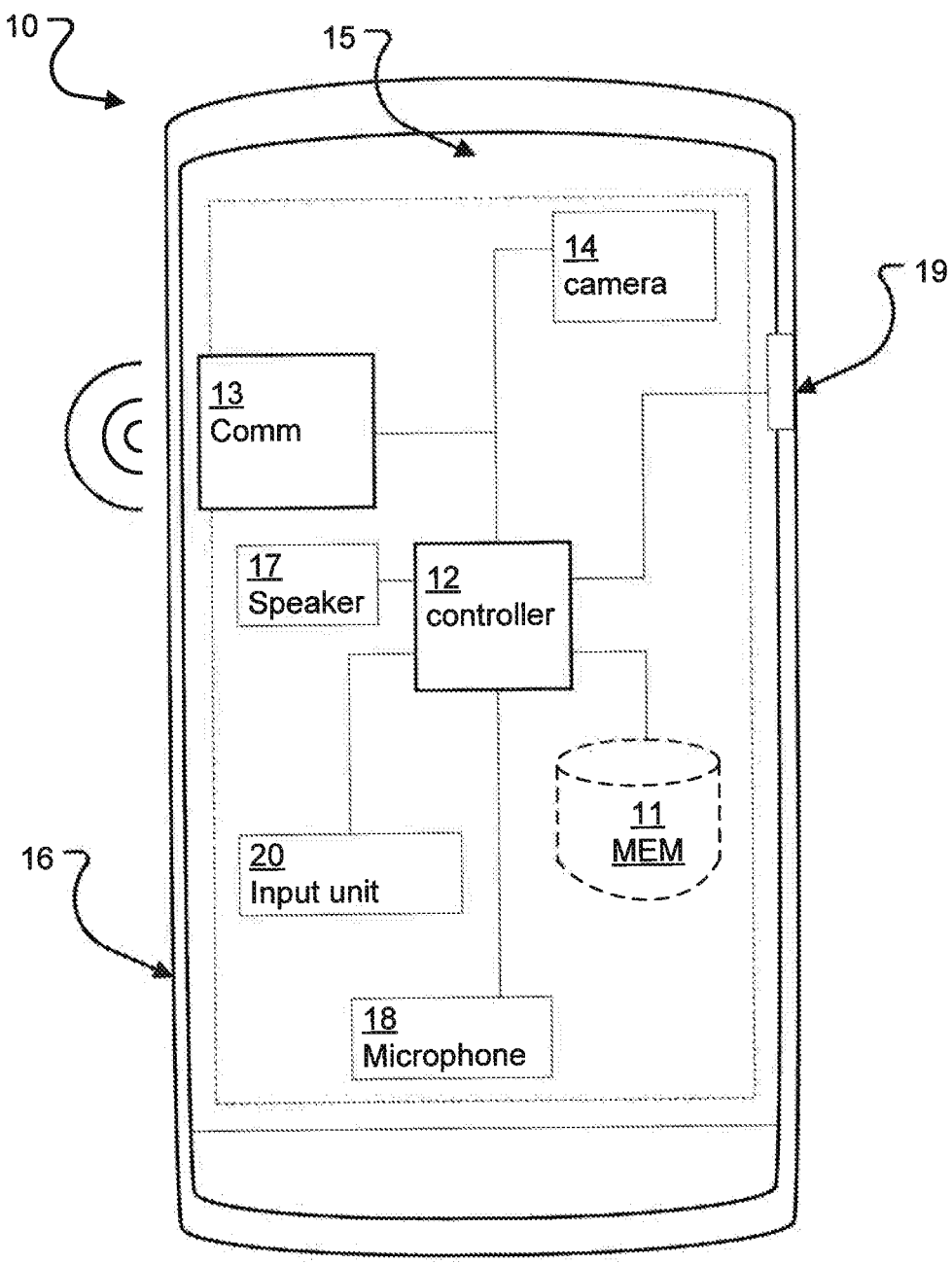
FIG. 1 discloses a block diagram of an electronic device, e.g. a mobile phone where the method is implemented.

The invention will now be described in more detail. According to one aspect of the invention, shown in FIG. 1, an electronic device is illustrated generally at 10. The electronic device 10 will be referred to below as a mobile phone. However, as mentioned above, reference to "mobile phone" includes various other devices, such as, for example, those mentioned above.

The mobile phone 10 comprises conventional components such as radio interfaces for wireless communication 13, a case (housing) 16, a speaker 17, a microphone 18, a display 15, e.g. liquid crystal display, light emitting diode display, or other display, and an on/off switch 19, and an input unit, such as a number of keys generally indicated at 20. The keys may include a number of keys having different respective functions. For example, the keys may include a navigation key, selection key or some other type of key. As an example, the navigation key may be used to scroll through lists, i.e. albums of images, shown on the display 15, to select one or more of the items, i.e. images, shown in a list on the display 15. The speaker 17, microphone 18, display 15 and keys 20 may be used and function in the usual ways in which a mobile phone typically is used, e.g. to initiate, to receive and/or answer telephone calls, to send and to receive text messages, to connect with and carry out various functions via a network, such as the internet or some other network. These are examples; there may be other uses that currently exist or may exist in the future. The mobile phone further includes a controller circuit 12. The controller circuit is configured to execute the method according to the invention. The controller is typically a processor comprising a computer code for executing the method. However, the method may as well be hardware implemented or a combination of hardware and software.

The mobile phone also includes a camera 14, which is arranged to receive or to capture an image. The camera 14 may be the same type of camera typically used in a mobile phone or it may be another type of camera. As an example, the camera 14, display 15 and an image capture key 20 may be used in a conventional manner to capture an image, e.g. the view seen by the camera 14 may be shown on the display 15 while the user views that image and as desired selectively presses the image capture key 20 to capture an image and to store the captured image in a memory 11. The setting of burst shoot or time shift mode may be selected by a user. The settings may include burst capture length, burst capture frame rate, exposure, capture start time offset relative to button press and any other relevant settings. The user may also select the burst capture settings by accepting default settings for all of the burst capture settings.

Figure 2:
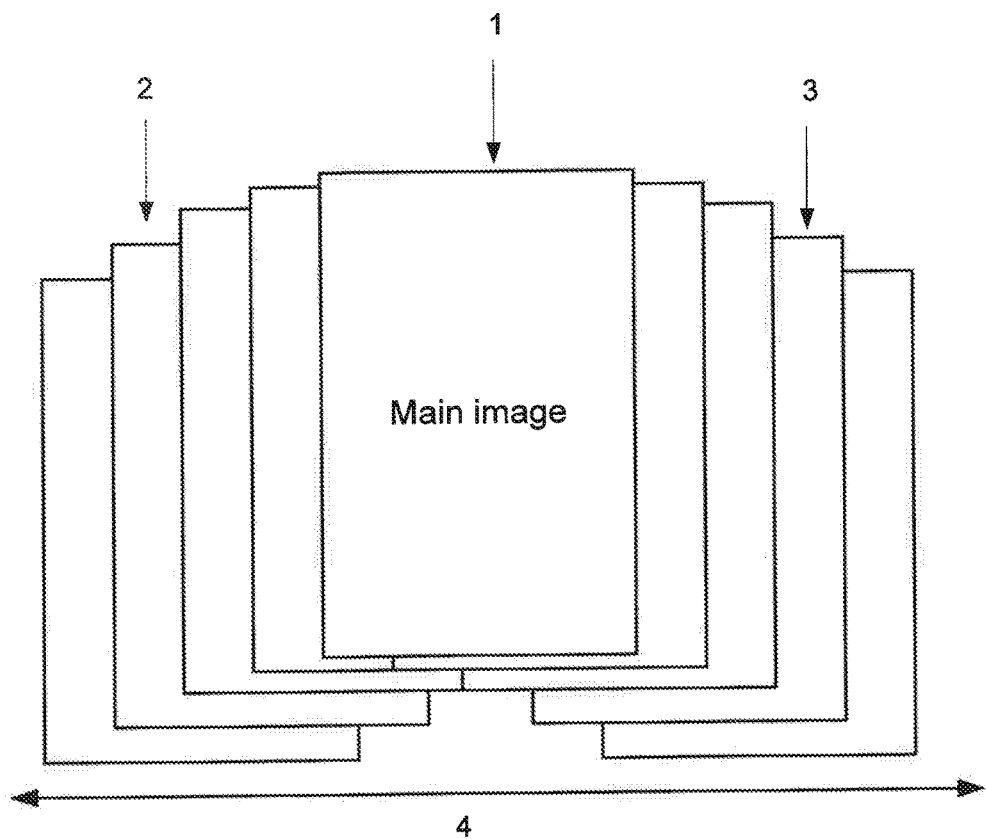
FIG. 2 discloses an example of a burst of images according to the invention.

According to one aspect of the invention, as shown in FIG. 2, a burst of images 4 is captured by selecting burst shoot or time shift mode on a camera 14 of the mobile phone and stored in an album of images on the mobile phone. The captured burst of images may contain at least two images, a main image 1 and at least one additional frame 2, 3, preferable three or more, before 2 and/or after 3 the main image 1.

According to one aspect of the invention, when a user is navigating between full screen images by navigating left-right or forward-back in an album of images, the additional images or frames before the main image 1, pre-images 2, are being played back before it stops at the main image 1 as an in-transition or zoom in effect. The pre-images are played back as a frame-by-frame animation, with a specific frame rate, until stopping at the main image. In one example, "Ease-in"/"Ease-out" transition timing technique may be applied to the frame animation to enable a smoother, more natural transition effect. One way to make animations move in a more life-like manner is to vary the rate at which they move. Animation imitates the world that we live in, so it's important that movements within the animations feel as if they are based on real world movements, even if they are exaggerated. In our world, it is very rare that something will move at a constant rate. For example, when a user raises his arm straight up above his head, the action usually starts out slowly and then quickly accelerates. This generates an interesting visual effect that makes the photos come alive before they stop at the main image 1. This can be done in a subtle way by using few frames or exaggerated by using more frames. In addition, a light effect can be applied to amplify the animation. Similarly, when going to the next image, the additional images after the main image 1, pro-images 3, was taken are played back as an out-transition or zoom out effect, before the next image is displayed by using the same in-transition effect.

According to one aspect of the invention, the same visual effect, as presented above, is utilized when swiping over images in an album overview mode. The visual effect makes images come alive when rearranging the grid, such as zoom in/zoom out transitions or when scrolling to see more pictures.

According to one aspect of the invention, the visual effect could be used to "hide" loading time of the full resolution of the main image, e.g. displaying the pre-images and the pro-images with lower resolutions could be utilized during the transition duration and only the final frame would be displayed with full resolution.

The function of achieving an image sequence per "main photo" could be hidden and turned on by default. E.g. there is no need to go into a specific mode in order to create compatible photos. This means that each photo would consist of a sequence of around 3 or more images, but all images except the main photo wouldn't need to be stored with full resolution since this is an effect only utilized when browsing photos on the device, thus saving some space in comparison with storing full resolution image sequences.

Figure 3:
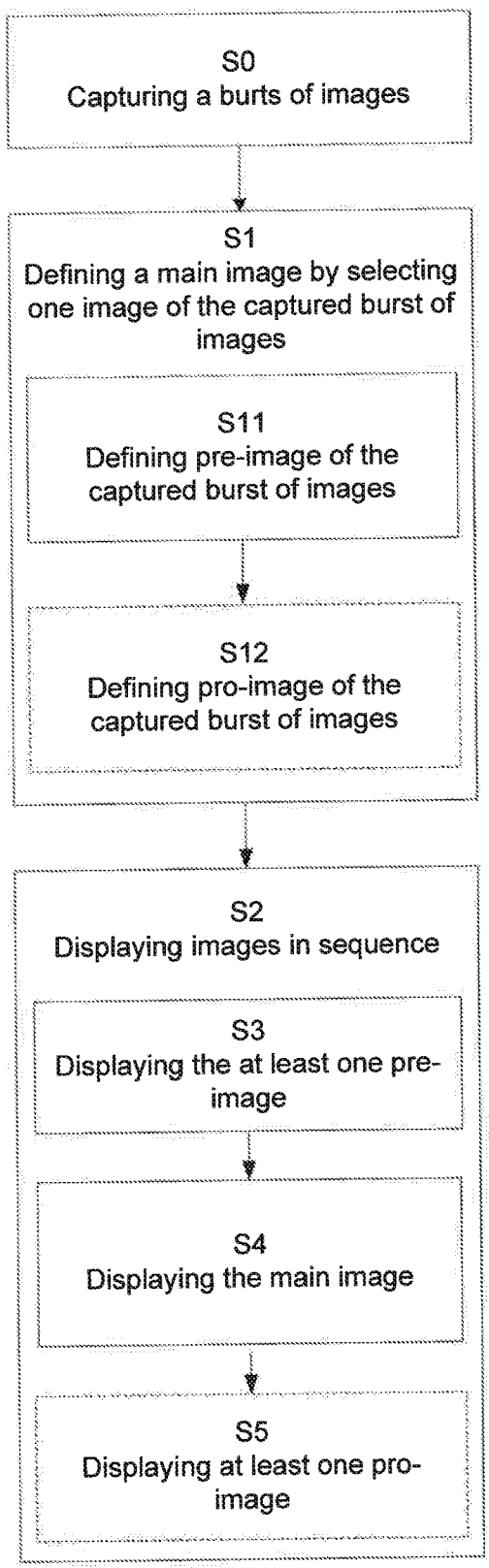
FIG. 3 discloses a flowchart of the method in an electronic device according to the invention.

The method will now be described starting from FIG. 3 disclosing method steps, performed in an electronic device 10, i.e. a mobile phone, for displaying an image on a display 15 of the electronic device, wherein the image is one selected image of a burst of images. When the described steps are not dependent on each other, these steps may be implemented in any combination.

According to one aspect the method is initiated by the camera of the mobile phone capturing S0 an image in a burst series, or a stream of images. This implies that a user of the mobile phone takes a photo by using burst mode or time shift mode. The number of images may be captured at a set frame rate. For example, the images may be captured at a default frame rate. In another example, the images may be captured at a frame rate input by the user. According to one example, the burst of images includes at least three images. After the images have been captured, the images may be processed. For example, the captured burst of images may be displayed to the user. In another example, the burst of images may be grouped together in a photo gallery or a photo album and the user may be able to expand the burst of images to view the all the images within the captured burst of images. The images may be in any format, such as JPEG, TIFF, PNG, GIF, BMP, or any other acceptable format.

In the first step S1 the main image 1 is defined by selecting one image of the captured burst of images 4. In one aspect of the step of selecting, the images obtained before the selected main image S11 in the burst of images are defined as pre-images 2. In one aspect of the step of selecting, the images obtained after the selected main image S12 are defined as pro-images 3. According to one aspect the method further comprises the steps of storing said pre-images 2 and pro-images 3 with low resolution and storing said main image 1 with high resolution in the memory 11 of the mobile phone.

In the second step S2 the defined images is displayed in sequence when main image is selected by a user.

Figure 4:
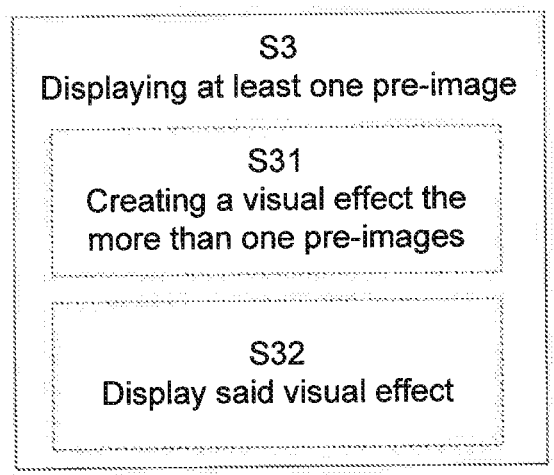
FIGS. 4a-b discloses a flowchart of the method in an electronic device according to the invention.

In a third step, the defined at least one pre-image 2 is displayed S3 on the display 15. According to one aspect of the step of displaying the at least one pre-image S3, as shown in FIG. 4a, wherein the pre-image consists of more than one image, comprises generating a visual effect S31 based on the more than one pre-image 2 associated with the selected main image 1. The visual effect is subsequently displayed S32 in association with displaying the defined pre-images by display means of the mobile phone. According to one aspect of the step of generating a visual effect comprises displaying the at least more than one pre-images directly after each other's in sequence, starting with the first pre-image of the burst of images, thus creating an in-transition or zoom in effect. According to one aspect of the step of displaying comprises pre-defining a rate of displaying the at least more than one pre-image. According to one aspect of the step of displaying comprises adding a light effect or a sound effect when displaying the pre-image or the sequence of pre-images.

In the fourth step S4 the main image is displayed in sequence after the pre-image has been displayed on the display of the mobile phone. The main image is displayed on the display until the user of the mobile phone decides to change to another image or another view. According to one aspect of the step of displaying comprises adding a light effect or a sound effect when displaying the main image.

Figure 4B:
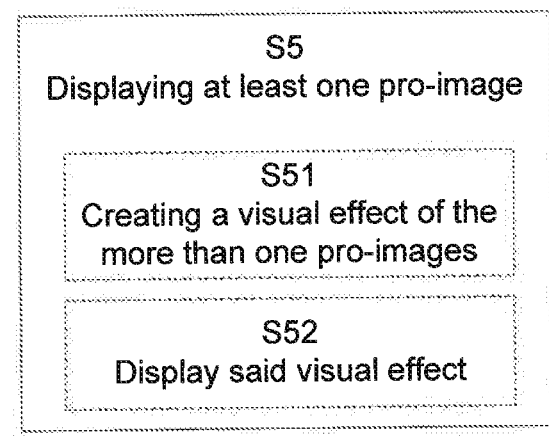

In the fifth step S5 the at least one pro-image 2 is displayed on the display of the mobile phone when the user decides to stop displaying the selected main image and selects another image or view. According to one aspect the step of displaying the at least one pro-image, as shown in FIG. 4b, wherein the pro-image consists of more than one image, comprises creating a visual effect S51 of the more than one pro-images and displaying S52 the at least more than one pro-image 3 with the visual effect after displaying the main image 1. According to one aspect of the step of creating a visual effect comprises displaying the at least more than one pro-images directly after each other's, starting with the first pro-image of the burst of images, thus creating an out-transition or zoom out effect. According to one aspect of the step of displaying comprises pre-defining a rate of displaying the at least more than one pro-image. According to one aspect of the step of displaying comprises adding a light effect or a sound effect when displaying the pro-image or sequence of pro-images.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The foregoing has described the principles, preferred embodiments and modes of operation of the present invention. However, the invention should be regarded as illustrative rather than restrictive, and not as being limited to the particular embodiments discussed above. The different features of the various embodiments of the invention can be combined in other combinations than those explicitly described. It should therefore be appreciated that variations may be made in those embodiments by those skilled in the art without departing from the scope of the present invention as defined by the following claims.

The invention claimed is:

1. A method for displaying an image in an image album application on a display of an electronic device, wherein the image is one selected image of a burst of images, wherein the method comprises the steps of:
   a. capturing, using an image capture device, a burst of images, comprising at least three images;
   b. selecting, by the electronic device, one image of the captured burst of images as a main image;
   c. defining at least one image obtained before said main image as pre-images;
   d. defining any image obtained after said main image as a pro-image;
   e. individually displaying, responsive to detecting user navigation between full screen images to said main image in the album application, the defined pre-images and the selected main image in sequence on the display, wherein the pre-images are played back as a frame-byframe animation until stopping at the main image, the main image being the last image to be displayed; and f. displaying, responsive to detecting user navigation between full screen images from said main image to a subsequent image in the album application, defined pro-images in sequence on the display, wherein the pro-images are played back as a frame-by-frame animation before switching to displaying said subsequent image.

2. The method according to claim 1, wherein the defined pre-images comprises more than one image and wherein the method further comprises the steps of:

a. generating a visual effect of the more than one pre-images; and b. displaying the at least more than one pre-images with said generated visual effect before displaying the defined main image.

3. The method according to claim 1, wherein the pro-images comprises more than one image and wherein the method further comprises the steps of:

a. generating a visual effect of the more than one pro-image; and b. displaying the at least more than one pro-image with said generated visual effect after displaying the main image.

4. The method according to claim 2, wherein the visual effect comprises the steps of:

a. creating a zoom in effect by displaying the at least more than one pre-image directly after each other's, image by image, until stopping at the main image.

5. The method according to claim 4, wherein a rate of displaying the at least more than one pre-images is predefined.

6. The method according to claim 3, wherein the visual effect comprises the steps of:

a. creating a zoom out effect by displaying the at least more than one pro-images directly after each other's, image by image, starting with the first of the at least one pro-images.

7. The method according to claim 6, wherein a rate of displaying the at least more than one pro-image is predefined.

8. The method according to claim 1, wherein said method further comprises the steps of:

a. adding a light effect or a sound effect when displaying the main image.

9. The method according to claim 1, wherein said burst of images is captured by using burst shot mode.

10. The method according to claim 1, wherein said burst of images is captured by using time shift mode.

11. The method according to claim 1, wherein said method further comprises the steps of:

a. storing said pre-images obtained before said main image with low resolution; and b. storing said main image with high resolution.

12. The method according to claim 1, wherein said method further comprises the steps of:

a. storing said pro-images obtained after said main image with low resolution.

* * * * *